No. 676,528. Patented June 18, 1901.
I. A. BRADDOCK.
WAVE POWER.
(Application filed July 26, 1900.)
(No Model.) 2 Sheets—Sheet 1.

WITNESSES:
H. Walker
C. R. Ferguson

INVENTOR
Isaac A. Braddock.
BY
Munn & Co
ATTORNEYS

No. 676,528. Patented June 18, 1901.
I. A. BRADDOCK.
WAVE POWER.
(Application filed July 26, 1900.)
(No Model.) 2 Sheets—Sheet 2.

WITNESSES:
H Walker
C R Ferguson

INVENTOR
Isaac A. Braddock.
BY
Munn & Co
ATTORNEYS

THE NORRIS PETERS CO., PHOTO-LITHO., WASHINGTON, D. C.

UNITED STATES PATENT OFFICE.

ISAAC A. BRADDOCK, OF HADDONFIELD, NEW JERSEY.

WAVE-POWER.

SPECIFICATION forming part of Letters Patent No. 676,528, dated June 18, 1901.

Application filed July 26, 1900. Serial No. 24,903. (No model.)

*To all whom it may concern:*

Be it known that I, ISAAC A. BRADDOCK, a citizen of the United States, and a resident of Haddonfield, in the county of Camden and State of New Jersey, have invented a new and Improved Wave-Power, of which the following is a full, clear, and exact description.

This invention relates to improvements in machines actuated by incoming and outgoing waves to store or compress air to be used for driving machinery; and the object is to provide a machine of this character that shall be simple in its construction, not liable to get out of order, and positive in action during both movements of the waves.

I will describe a wave-power embodying my invention and then point out the novel features in the appended claims.

Reference is to be had to the accompanying drawings, forming a part of this specification, in which similar characters of reference indicate corresponding parts in both figures.

Figure 1:
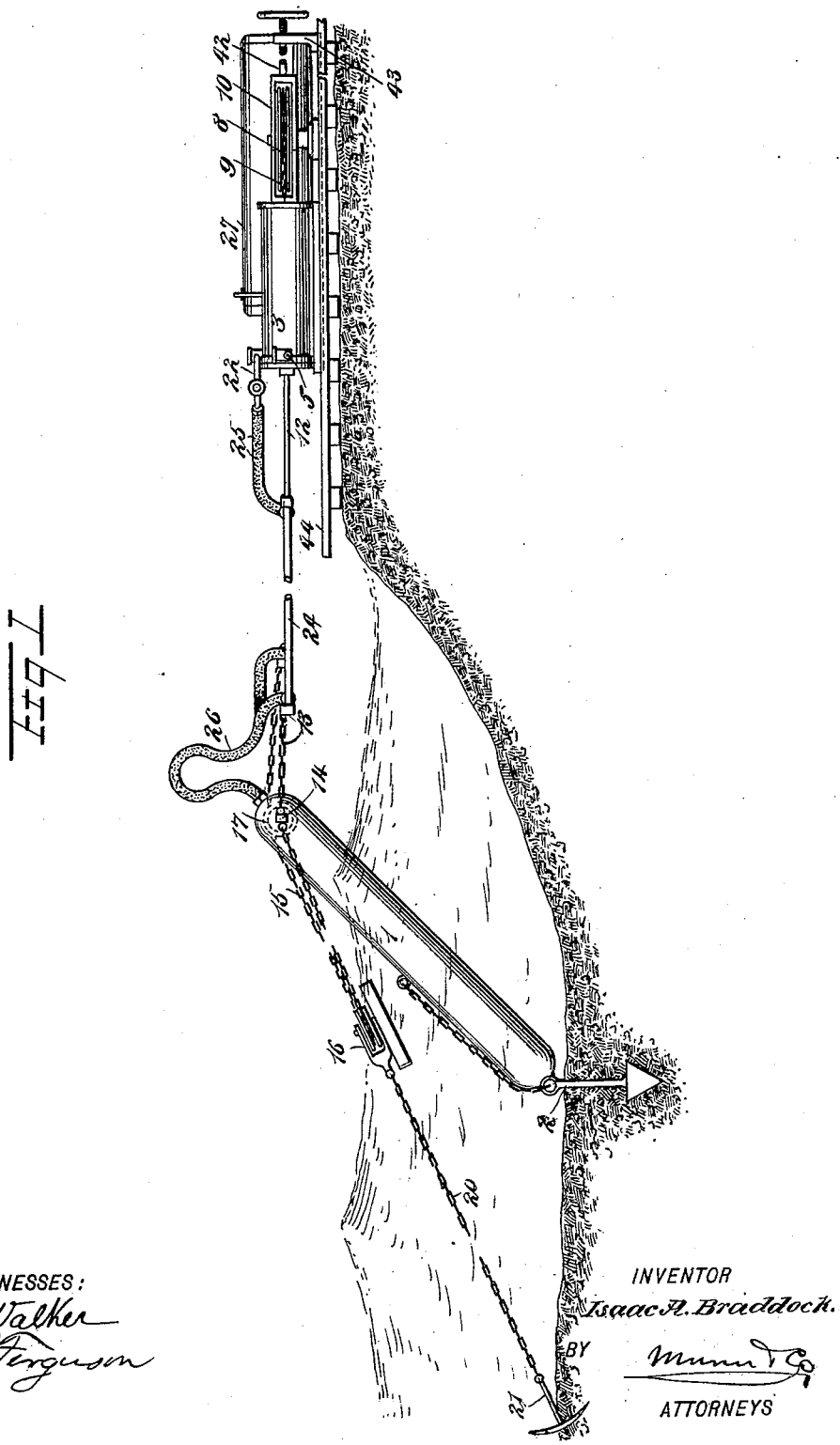
Figure 2:
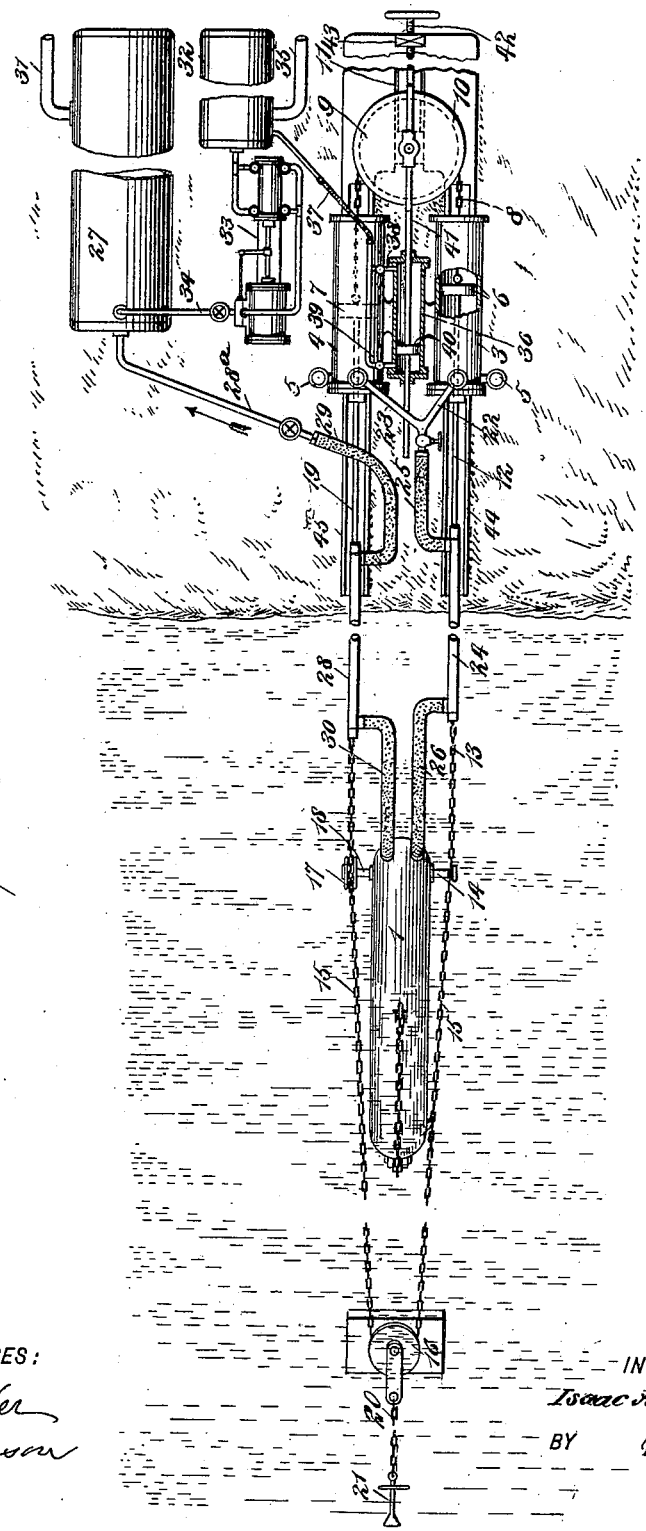

Figure 1 is a side elevation of a wave-power mechanism embodying my invention; and Fig. 2 is a plan view thereof, the float in both figures being shown in a neutral position.

Referring to the drawings, 1 designates a hollow float of any desired dimensions and shape designed not only to actuate a compressing device, but to serve as a receiver for the air in its passage to the storage vessel in order to cool the air before reaching said storage vessel. This float has swinging connection at its lower end with an anchor 2, designed to be embedded in the bed of the stream or body of water near the shore, as indicated in the drawings.

On the shore are located two cylinders 3 4, each provided with an inlet-valve 5. Operating in the cylinder 3 is a piston 6, and operating in the cylinder 4 is a piston 7. These cylinders at their rear ends are wholly open, and the two pistons are connected one with the other by means of a chain or similar device 8, which extends around a sheave 9, mounted in a boxing 10, adjustable in ways 11, as will be hereinafter described. From the stem 12 of the piston 6 a pipe 24 extends to a connection with a chain 13, which is connected to the float 1. As here shown, the chain is connected to an arm 14, extended outward from the upper end of said float, and from this arm 14 a chain 15 is carried around a floating pulley 16 and thence around a wheel 17, mounted to rotate on an arm 18, attached to the upper end of the float, and the end of this chain is connected to a pipe 28, extended to the stem 19 of the piston 7. The floating pulley 16 is connected by means of a chain or cable 20 with an anchor 21, so that said pulley may move up and down with the movements of the float.

From the cylinders 3 and 4 pipes 22 and 23 extend and connect with the pipe 24, which communicates with the interior of the float 1. To permit of the movements of the float by the action of the waves, the pipe 24 has a flexible connection 25 with the pipes 22 and 23 and a flexible connection 26 with the float. A storage vessel or tank 27, located on the shore, has a valve-controlled pipe connection 28ª with the pipe 28, and this pipe 28 has a flexible connection 29 with the pipe 28ª and a flexible connection 30 with the interior of the said float.

Air compressed in the vessel 27 may be carried through a pipe 31 to any desired point to actuate machinery, and to secure a greater compression of air I may employ an auxiliary or high-pressure cylinder 32, connected with a pump 33, receiving air from the vessel 27 through a pipe 34, the air in the cylinder 27 being compressed by the pistons 6 and 7 and cooled by passing through the cylinder 1. From this auxiliary vessel 32 a pipe 35 will carry the compressed air to the machinery to be operated. For the purpose of economy the air-exhaust from the motive portion of the pump is discharged into the compression-cylinder through a pipe, as indicated in Fig. 2. I also employ the highly-compressed air in this vessel 32 for shifting the cylinders 3 and 4 toward or from the water's edge, as occasion may require, upon the rising or falling of the tide. For this purpose a cylinder 36 is located between the cylinders 3 and 4 and is rigidly attached thereto, and a pipe 37, leading from the cylinder 32, has valve-controlled pipe connections 38 and 39 with opposite ends of the cylinder 36. Arranged within the cylinder 36 is a piston 40, which is held stationary during the operation of the cylinder. The stem 41 of this piston projects through a head of the cylinder 36 and connects with the frame 10, and the opposite side of this frame 10 is engaged by a screw-rod 42, operating in a fixed standard 43. The cylinders 3 and 4 are mounted to move on tracks 44 and 45. Should it be desired to move the cylinders forward or closer to the water, the valve in the pipe 37 and the connection 39 are to be opened, so that the compressed air in the vessel 32 will flow into the cylinder 36 forward of the piston 40. Before admitting the air the person in charge is to manipulate the screw-rod 42, moving the piston 40 to the end of the cylinder, so that the air-pressure by bearing against the piston 40 will move the cylinder 36 forward, and consequently move the cylinders 3 and 4 forward on their tracks. When the desired adjustment is reached, the air of course is to be closed off by the valve in the pipe 37, and the cylinders will remain as adjusted. The frame 10 will be anchored by the screw-rod. It is to be understood that after adjusting the cylinders the screw-rod is to be manipulated to move the frame 10 to its proper relation with the cylinders. When it is desired to move them in the opposite direction, the air from the vessel 32 must pass through the connection 38 to the opposite side of the cylinder and the screw-rod be properly turned to permit the backward movement of the cylinder.

In operation an incoming wave will cause the float 1 to rise toward a perpendicular position, and during this movement of the float the piston 6 will be drawn forward, forcing the air from the cylinder 3 through the pipe 24 into the float, where it will become cooled, and the air in the float will be forced through the pipe 28 into the storage vessel 27, from which it may be conveyed by the means heretofore mentioned. During this upward movement of the float the piston 7 will be moved to its rearward position by means of its connection 8 with the piston 6, and when the wave recedes or moves outward the float will be moved downward by its own weight and by drawing upon the chain 15 will move the piston 7 forward, forcing the air into the float and thence into the storage vessel, as before described, and during this movement it is obvious that the piston 6 will be moved to its rear position.

The object in providing means for moving the cylinders toward and from the water is to accommodate the device to the rise and fall of the tides and to storms or calms which would influence the height of the water.

Having thus described my invention, I claim as new and desire to secure by Letters Patent—

1. A wave-power, comprising a hollow float having pivotal connection with an anchor, a cylinder located on the shore, a piston operating in said cylinder, a connection between said piston and the float, a pipe connection between the cylinder and the float, a storage vessel, and a pipe connection between said storage vessel and the float, substantially as specified.

2. A wave-power, comprising a hollow float, mounted to rise and fall by the motion of the waves, a pair of cylinders located on the shore, pistons in said cylinders, pipe connections between said two cylinders and the float, connections between the pistons and the float, whereby the said pistons are operated alternately in opposite directions, a storage vessel, and a pipe connection between said storage vessel and the float, substantially as specified.

3. A wave-power, comprising a hollow float, an anchor to which the float is pivotally connected, two cylinders located on the shore, pistons in said cylinders, pipe connections between said cylinders and the float, a chain or like connection between one of the pistons and the float, a chain or the like extended from the float, an anchored pulley around which said chain extends, a pulley carried by the float and also around which said chain passes, an end of said chain having connection with the piston of the other cylinder, a storage vessel, and a pipe connection between said storage vessel and the float, substantially as specified.

4. A wave-power, comprising a hollow float anchored to swing in the water, cylinders located on the shore, pistons operating in said cylinders and having connection with the float, a pipe connection between said cylinders and the float, a receiver for air from the float, a track on which the cylinders are movable, and means actuated by air-pressure for moving said cylinders, substantially as specified.

5. A wave-power, comprising a float, a pair of cylinders, pistons in said cylinders, connections between said pistons and the float, whereby the pistons are operated alternately in opposite directions, and a storage vessel for receiving air forced from the cylinders, said float forming a portion of the conduit through which the air passes to the storage vessel, substantially as specified.

6. A wave-power, comprising a float, cylinders adapted to be located on the shore, pistons in said cylinders, connections between the pistons and float, whereby the pistons are operated alternately in opposite directions, a storage-reservoir for receiving air discharged from the cylinder, an auxiliary cylinder connected to the first-named cylinder, means for directing compressed air into either end of said auxiliary cylinder, and means for adjusting and holding the piston in the auxiliary cylinder, substantially as specified.

7. A wave-power, comprising a float, cylinders adapted to be located on the shore, pistons in said cylinders, connections between said pistons and the float, a sheave rearward of the cylinders, a connection between said two pistons, the said connection extending around the sheave, and a storage vessel for air forced from the cylinders, substantially as specified.

In testimony whereof I have signed my name to this specification in the presence of two subscribing witnesses.

ISAAC A. BRADDOCK.

Witnesses:
CHAS. M. HILL,
THOMAS HILL.